US010677201B2

(12) United States Patent
Kosaka et al.

(10) Patent No.: US 10,677,201 B2
(45) Date of Patent: Jun. 9, 2020

(54) INTERNAL EGR AMOUNT CALCULATION DEVICE FOR INTERNAL COMBUSTION ENGINE

(71) Applicant: HONDA MOTOR CO., LTD., Tokyo (JP)

(72) Inventors: Yosuke Kosaka, Wako (JP); Koichiro Shinozaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1027 days.

(21) Appl. No.: 13/928,929

(22) Filed: Jun. 27, 2013

(65) Prior Publication Data

US 2014/0007854 A1 Jan. 9, 2014

(30) Foreign Application Priority Data

Jul. 5, 2012 (JP) ................................ 2012-151237

(51) Int. Cl.
*F02D 13/02* (2006.01)
*F02M 26/01* (2016.01)

(52) U.S. Cl.
CPC ......... *F02M 26/01* (2016.02); *F02D 13/0265* (2013.01); *Y02T 10/18* (2013.01)

(58) Field of Classification Search
CPC ............ F02M 25/0752; F02D 13/0265; F02D 13/0261; F02D 2041/001; F02D 41/0062; Y02T 10/18; Y02T 10/121; Y02T 10/47

(Continued)

(56) References Cited

U.S. PATENT DOCUMENTS 6,904,356 B2 * 6/2005 Uchida ............... F02D 13/0219
123/568.14
7,275,516 B1 * 10/2007 Cunningham ...... F02D 13/0261
123/305

(Continued)

FOREIGN PATENT DOCUMENTS

JP 2004-044549 A 2/2004
JP 2004-108262 A 4/2004

(Continued)

OTHER PUBLICATIONS

German Search Report application No. 10 2013 212 993.9 dated Mar. 26, 2014.

(Continued)

*Primary Examiner* — Hai H Huynh
*Assistant Examiner* — Gonzalo Laguarda
(74) *Attorney, Agent, or Firm* — Squire Patton Boggs (US) LLP

(57) ABSTRACT

An internal EGR amount calculation device for an internal combustion engine, which is capable of properly and easily calculating an internal EGR amount according to the change in the valve timing and enhancing the calculation accuracy of the internal EGR amount. The device includes an ECU. The ECU calculates an amount of burned gases remaining in a cylinder when the valve timing is predetermined reference timing, as a reference internal EGR amount. The ECU calculates a change in the amount of burned gases flowing into or out of the cylinder with respect to the amount of burned gases flowing into or out of the cylinder when the valve timing is the predetermined reference timing, as an internal EGR increase/decrease amount. Then, the ECU calculates the internal EGR amount by adding the internal EGR increase/decrease amount to the reference internal EGR amount.

8 Claims, 12 Drawing Sheets

(58) Field of Classification Search
USPC .................. 123/90.15, 90.16, 90.17, 568.14
See application file for complete search history.

(56) References Cited

U.S. PATENT DOCUMENTS

2001/0042529 A1    11/2001   Kawasaki et al.
2004/0139949 A1*   7/2004   Koseki ..................... F01L 1/20
                                                          123/568.14

FOREIGN PATENT DOCUMENTS

JP         2004-251182 A    9/2004
JP         2007-100522 A    4/2007

OTHER PUBLICATIONS

Japanese Patent Office, Office Action for corresponding JP Appln. No. 2012-151237, dated Aug. 4, 2015.

* cited by examiner

WHEN CAIN=CAEX=0

WHEN CAIN=CAEX=0

WHEN CAIN=0 AND CAEX>0

WHEN CAIN=0 AND CAEX>0

WHEN CAIN=0 AND CAEX>0

WHEN CAIN>0 AND CAEX=0

WHEN CAIN>0 AND CAEX=0

INTERNAL EGR AMOUNT CALCULATION DEVICE FOR INTERNAL COMBUSTION ENGINE

BACKGROUND OF THE INVENTION

Field of the Invention

The present invention relates to an internal EGR amount calculation device for an internal combustion engine, for calculating an internal EGR amount of the engine.

Description of the Related Art

Conventionally, an internal EGR amount calculation device for an internal combustion engine is known as disclosed in Japanese Laid-Open Patent Publication (Kokai) No. 2004-251182 is known. In this internal EGR amount calculation device, an internal EGR amount is calculated by adding the amount of blown back gases to the amount of residual burned gases. The amount of residual burned gases represents the amount of burned gases remaining in a cylinder, and is calculated, specifically, using an in-cylinder capacity and the like by the equation of state of gas.

Further, the amount of blown back gases represents the amount of burned gases blown back into the cylinder after the burned gases flows from an exhaust passage into an intake passage due to a pressure difference between the intake passage and the exhaust passage, during a valve overlap time period. The amount of blown back gases is calculated using the nozzle equation by regarding a path through which burned gases flows as a nozzle.

The nozzle equation includes a time-integral value $\Sigma(\mu A)$ of an effective opening area. The time-integral value $\Sigma(\mu A)$ of the effective opening area is calculated, specifically, by calculating a crank angle-integral value f1 (OL) by integrating the effective opening area with respect to crank angle, and dividing the crank angle-integral value f1 (OL) by a rotational speed NE of the engine.

In general, in the case of the engine, when the valve timing of at least one of an intake valve and an exhaust valve thereof is changed, the amount of gases flowing into or out of the cylinder during the valve-opening time periods of the intake valve and the exhaust valve (hereinafter referred to as the "in-cylinder inflow/outflow gas amount") is changed. On the other hand, the internal EGR amount calculation device disclosed in Japanese Laid-Open Patent Publication (Kokai) No. 2004-251182 takes into account only the amount of gases blown back into the cylinder during the valve overlap time period without taking into account a change in the in-cylinder inflow/outflow gas amount caused by such a change in the valve timing. Therefore, when the in-cylinder inflow/outflow gas amount is changed by a change in the valve timing, the calculation accuracy of the internal EGR amount is sometimes reduced by the change in the in-cylinder inflow/outflow gas amount. In addition to this, an equation for calculating the amount of the blown-back gases includes the time-integral value $\Sigma(\mu A)$ of the effective opening area, and hence when the time-integral value $\Sigma(\mu A)$ is calculated, it is necessary to integrate the effective opening area with respect to crank angle, which increases computational load.

SUMMARY OF THE INVENTION

It is an object of the present invention to provide an internal EGR amount calculation device for an internal combustion engine, which, even when valve timing of at least one of an intake valve and an exhaust valve is changed, is capable of properly and easily calculating an internal EGR amount according to the change in the valve timing, thereby making it possible to improve the calculation accuracy of the internal EGR amount.

To attain the above object, the present invention provides an internal EGR amount calculation device for an internal combustion engine, which changes an internal EGR amount, which is an amount of burned gases remaining in a cylinder, by changing valve timing of at least one of an intake valve and an exhaust valve, comprising valve timing-obtaining means for obtaining the valve timing, reference in-cylinder gas amount-calculating means for calculating a reference in-cylinder gas amount, which is an amount of burned gases remaining in the cylinder when the valve timing is set to a predetermined reference timing, inflow/outflow gas change amount-calculating means for calculating an amount of change in an amount of burned gases flowing into or out of the cylinder during valve-opening time periods of the intake valve and the exhaust valve, with respect to an amount of burned gases flowing into or out of the cylinder when the valve timing is set to the predetermined reference timing, as an inflow/outflow gas change amount, according to the valve timing, and internal EGR amount-calculating means for calculating the internal EGR amount based on the reference in-cylinder gas amount and the inflow/outflow gas change amount.

With the configuration of this internal EGR amount calculation device, the internal EGR amount is calculated based on the reference in-cylinder gas amount and the inflow/outflow gas change amount. In this case, the inflow/outflow gas change amount is calculated as an amount of change in the amount of in burned gases flowing into or out of the cylinder during valve-opening time periods of the intake valve and the exhaust valve, with respect to the amount of burned gases flowing into or out of the cylinder when the valve timing is set to a predetermined reference timing, according to the valve timing. On the other hand, the reference in-cylinder gas amount is an amount of burned gases remaining in the cylinder when the valve timing is set to a predetermined reference timing. Therefore, by calculating the internal EGR amount based on this reference in-cylinder gas amount and the above-mentioned inflow/outflow gas change amount, it is possible to properly and accurately calculate the internal EGR amount while causing a change in the amount of burned gases flowing into or out of the cylinder caused by a change in the valve timing to be reflected thereon. This makes it possible to improve the calculation accuracy of the internal EGR amount.

Preferably, the internal EGR amount calculation device further comprises exhaust temperature-obtaining means for obtaining an exhaust temperature, which is a temperature of exhaust gases in an exhaust passage of the engine, exhaust pressure-obtaining means for obtaining an exhaust pressure, which is a pressure of exhaust gases in the exhaust passage of the engine, and reference in-cylinder capacity-obtaining means for obtaining a reference in-cylinder capacity, which is a capacity of the cylinder obtained when the valve timing is set to the predetermined reference timing, and the reference in-cylinder gas amount-calculating means calculates the reference in-cylinder gas amount, based on the exhaust temperature, the exhaust pressure, and the reference in-cylinder capacity, using an equation of state of gas.

With the configuration of the preferred embodiment, the reference in-cylinder gas amount is calculated, based on the exhaust temperature, the exhaust pressure, and the reference in-cylinder capacity, using the equation of state of gas. In the case of a general internal combustion engine, at the time when the intake valve starts to open, the exhaust valve is open, so that the pressure and temperature of gases in the cylinder become substantially equal to the exhaust pressure and the exhaust temperature, respectively. Therefore, by calculating the reference in-cylinder gas amount using the exhaust temperature and the exhaust pressure, it is possible to accurately calculate the reference in-cylinder gas amount. This makes it possible to maintain the calculation accuracy of the internal EGR amount at a high level (Note that throughout the specification, the term "obtain" used in the phrases "obtaining the exhaust temperature", "obtaining the exhaust pressure", "obtaining the reference in-cylinder capacity", and so forth is intended to include the meaning of directly detecting parameters indicative of the exhaust temperature, the exhaust pressure, and the reference in-cylinder capacity using sensors or the like, and estimating these parameters based on other parameters).

Preferably, the valve timing of the intake valve is configured to be variable, and the valve timing-obtaining means obtains the valve timing of the intake valve, the internal EGR amount calculation device further comprising outflow gas change amount-calculating means for calculating, based on the valve timing of the intake valve, an amount of change in an amount of burned gases flowing out of the cylinder with respect to a value of the amount of burned gases flowing out of the cylinder, obtained when the valve timing of the intake valve is set to the predetermined reference timing, as an outflow gas change amount, wherein the inflow/outflow gas change amount-calculating means calculates the inflow/outflow gas change amount based on the outflow gas change amount.

With the configuration of the preferred embodiment, a change in the amount of burned gases flowing out of the cylinder with respect to a value of the amount of burned gases flowing out of the cylinder, obtained when the valve timing of the intake valve is set to the predetermined reference timing, is calculated based on the valve timing of the intake valve, as the outflow gas change amount, and the inflow/outflow gas change amount is calculated based on the outflow gas change amount. Then, the internal EGR amount is calculated based on the reference in-cylinder gas amount and the inflow/outflow gas change amount. In this case, the reference in-cylinder gas amount is the amount of burned gases remaining in the cylinder when the valve timing of the intake valve is set to the predetermined reference timing, and the outflow gas change amount is calculated based on the valve timing of the intake valve, and hence the reference in-cylinder gas amount, the outflow gas change amount, the inflow/outflow gas change amount, and the internal EGR amount can be calculated in a single calculation process. This makes it possible to more easily calculate the internal EGR amount than by a calculation method disclosed in Japanese Laid-Open Patent Publication (Kokai) No. 2004-251182, which requires an integral computation process, thereby making it possible to reduce computational load in calculating the internal EGR amount. As a consequence, it is possible to enhance marketability.

Preferably, the valve timing of the exhaust valve is configured to be variable, and the valve timing-obtaining means obtains the valve timing of the exhaust valve, the internal EGR amount calculation device further comprising inflow gas change amount-calculating means for calculating, based on the valve timing of the exhaust valve, a change in an amount of burned gases flowing into the cylinder with respect to a value of the amount of burned gases flowing into the cylinder, obtained when the valve timing of the exhaust valve is set to the predetermined reference timing, as an inflow gas change amount, wherein the inflow/outflow gas change amount-calculating means calculates the inflow/outflow gas change amount based on the inflow gas change amount.

With the configuration of the preferred embodiment, a change in the amount of burned gases flowing into the cylinder with respect to a value of the amount of burned gases flowing into the cylinder, obtained when the valve timing of the exhaust valve is set to the predetermined reference timing, is calculated based on the valve timing of the exhaust valve, as the inflow gas change amount, and the inflow/outflow gas change amount is calculated based on the inflow gas change amount. Then, the internal EGR amount is calculated based on the reference in-cylinder gas amount and the inflow/outflow gas change amount. In this case, the reference in-cylinder gas amount is the amount of burned gases remaining in the cylinder when the valve timing of the exhaust valve is set to the predetermined reference timing, and the inflow gas change amount is calculated based on the valve timing of the exhaust valve, and hence the reference in-cylinder gas amount, the inflow gas change amount, the inflow/outflow gas change amount, and the internal EGR amount can be calculated in a single calculation process. This makes it possible to more easily calculate the internal EGR amount than by the calculation method disclosed in Japanese Laid-Open Patent Publication (Kokai) No. 2004-251182, which requires an integral computation process, thereby making it possible to reduce computational load in calculating the internal EGR amount. As a consequence, it is possible to enhance marketability.

Preferably, the valve timing of the intake valve and the valve timing of the exhaust valve are configured to be variable, and the valve timing-obtaining means obtains both the valve timing of the intake valve and the valve timing of the exhaust valve, the internal EGR amount calculation device further comprising outflow gas change amount-calculating means for calculating, based on the valve timing of the intake valve, a change in an amount of burned gases flowing out of the cylinder with respect to a value of the amount of burned gases flowing out of the cylinder, obtained when the valve timing of the intake valve is set to the predetermined reference timing, as an outflow gas change amount, and inflow gas change amount-calculating means for calculating, based on the valve timing of the exhaust valve, a change in an amount of burned gases flowing into the cylinder with respect to a value of the amount of burned gases flowing into the cylinder, obtained when the valve timing of the exhaust valve is set to the predetermined reference timing, as an inflow gas change amount, wherein the inflow/outflow gas change amount-calculating means calculates the inflow/outflow gas change amount based on the outflow gas change amount and the inflow gas change amount.

With the configuration of the preferred embodiment, a change in the amount of burned gases flowing out of the cylinder with respect to a value of the amount of burned gases flowing out of the cylinder, obtained when the valve timing of the intake valve is set to the predetermined reference timing, is calculated based on the valve timing of the intake valve, as the outflow gas change amount, and a change in the amount of burned gases flowing into the cylinder with respect to a value of the amount of burned gases flowing into the cylinder, obtained when the valve timing of the exhaust valve is set to the predetermined reference timing, is calculated based on the valve timing of the exhaust valve, as the inflow gas change amount. Then, the inflow/outflow gas change amount is calculated based on the outflow gas change amount and the inflow gas change amount. In this case, the reference in-cylinder gas amount is the amount of burned gases remaining in the cylinder when the valve timing of the exhaust valve and that of the exhaust valve are set to respective predetermined reference timings, and the outflow gas change amount and the inflow gas change amount are calculated based on the valve timing of the intake valve and the valve timing of the exhaust valve, respectively, and hence the reference in-cylinder gas amount, the outflow gas change amount, the inflow gas change amount, the inflow/outflow gas change amount, and the internal EGR amount can be calculated in a single calculation process. This makes it possible to more easily calculate the internal EGR amount than by the calculation method disclosed in Japanese Laid-Open Patent Publication (Kokai) No. 2004-251182, which requires an integral computation process, thereby making it possible to reduce computational load in calculating the internal EGR amount. As a consequence, it is possible to enhance marketability.

The above and other objects, features, and advantages of the present invention will become more apparent from the following detailed description taken in conjunction with the accompanying drawings.

DETAILED DESCRIPTION OF PREFERRED EMBODIMENTS

Figure 1:
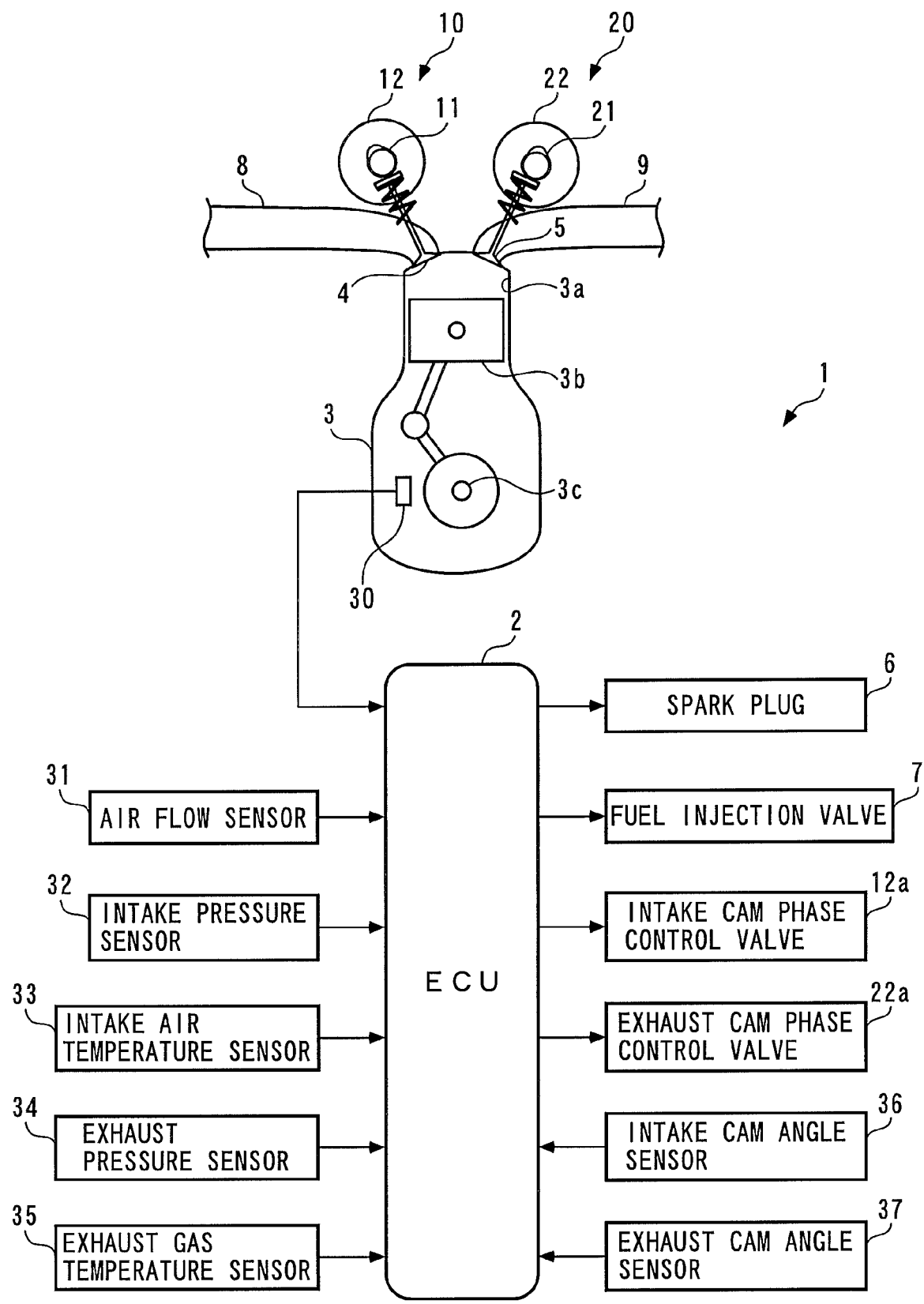
FIG. 1 is a schematic diagram of an internal EGR amount calculation device according to an embodiment of the present invention and an internal combustion engine to which the internal EGR amount calculation device is applied.

Hereafter, an internal EGR amount calculation device for an internal combustion engine according to an embodiment of the invention will be described with reference to drawings. As shown in FIG. 1, the internal EGR amount calculation device 1 includes an ECU 2. The ECU 2 calculates an internal EGR amount by a method, described hereinafter, and controls operating conditions of the internal combustion engine (hereafter referred to as the "engine") 3.

The engine 3 is an in-line four-cylinder gasoline engine having four pairs of cylinders 3a and pistons 3b (only one pair of which is shown), and is installed on a vehicle, not shown. The engine 3 includes intake valves 4 (only one of which is shown) provided for the respective cylinders 3a, exhaust valves 5 (only one of which is shown) provided for the respective cylinders 3a, an intake valve-actuating mechanism 10 for actuating the intake valves 4 to open and close the same, an exhaust valve-actuating mechanism 20 for actuating the exhaust valves 5 to open and close the same, and so forth.

The intake valve-actuating mechanism 10 comprises an intake cam shaft 11 for actuating the intake valves 4, and a variable intake cam phase mechanism 12. The variable intake cam phase mechanism 12 steplessly (i.e. continuously) changes a phase CAIN of the intake camshaft 11 with respect to a crankshaft 3c (hereinafter referred to as the "intake cam phase CAIN") to an advanced side or a retarded side, to thereby change the valve timing of the intake valves 4. The variable intake cam phase mechanism 12 is disposed at an end of the intake cam shaft 11 toward an intake sprocket (not shown).

Figure 2:
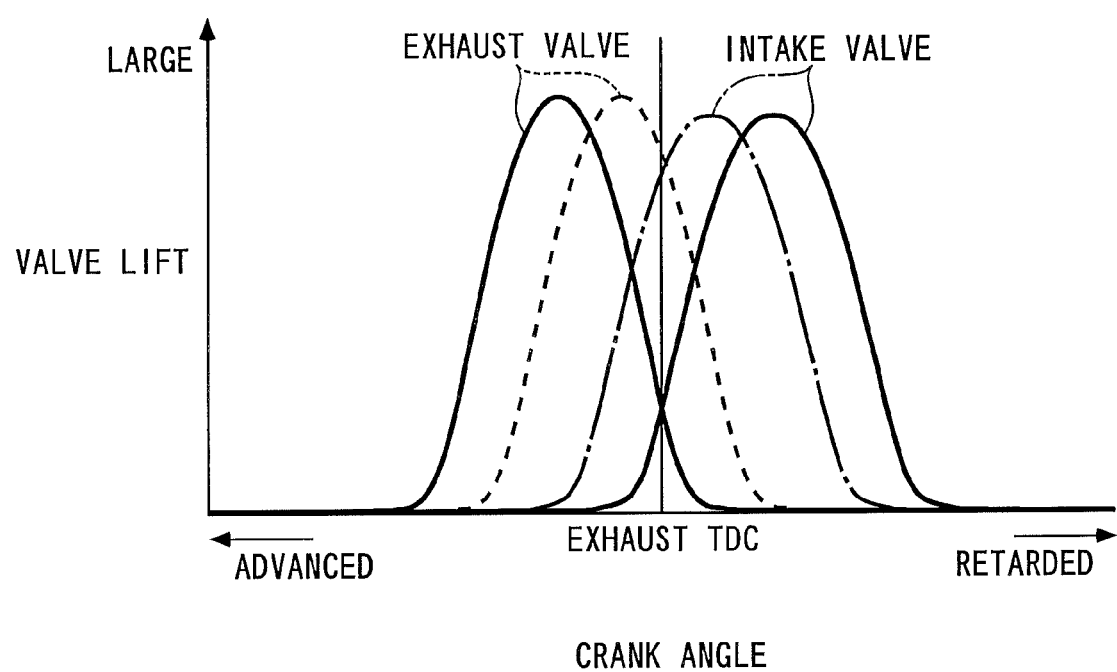
FIG. 2 is a diagram of valve lift curves showing changes in valve timings of an intake valve and an exhaust valve caused by a variable intake cam phase mechanism and a variable exhaust cam phase mechanism.

Although the variable intake cam phase mechanism 12 is configured, specifically, similarly to one proposed by the present assignee in Japanese Laid-Open Patent Publication (Kokai) No. 2007-100522, and hence detailed description thereof is omitted, the variable intake cam phase mechanism 12 includes an intake cam phase control valve 12a. In the case of the variable intake cam phase mechanism 12, the intake cam phase control valve 12a is controlled by a drive signal from the ECU 2, whereby the intake cam phase CAIN is continuously varied between 0 and a predetermined most advanced value CAIN_ad. This steplessly changes the valve timing of the intake valves 4 between a reference timing indicated by a solid line in FIG. 2 and a most advanced timing indicated by a one-dot chain line in FIG. 2. Note that in FIG. 2, an exhaust dead center is represented by an "exhaust TDC". This also applies to figures, referred to hereinafter.

In this case, the predetermined most advanced value CAIN_ad is set to a predetermined positive value. Therefore, the valve timing of the intake valves 4 is changed to a more advanced timing than the reference timing as the intake cam phase CAIN is increased from 0. This lengthens a valve overlap time period of the intake valves 4 and the exhaust valves 5. Further, in the following description, the valve timing of the intake valves 4 is referred to as the "intake valve timing".

The exhaust valve-actuating mechanism 20 comprises an exhaust cam shaft 21 for actuating the exhaust valves 5, and a variable exhaust cam phase mechanism 22. The variable exhaust cam phase mechanism 22 steplessly (i.e. continuously) changes a phase CAEX of the exhaust cam shaft 21 with respect to the crankshaft 3c (hereinafter referred to as the "exhaust cam phase CAEX") to the advanced side or the retarded side, to thereby change the valve timing of the exhaust valves 5. The variable exhaust cam phase mechanism 22 is disposed at an end of the exhaust camshaft 21 toward an exhaust sprocket (not shown).

The variable exhaust cam phase mechanism 22 is configured similarly to the above-described variable intake cam phase mechanism 12, and includes an exhaust cam phase control valve 22a. In the case of the variable exhaust cam phase mechanism 22, the exhaust cam phase control valve 22a is controlled by a drive signal from the ECU 2, whereby the exhaust cam phase CAEX is continuously varied between 0 and a predetermined most retarded value CAEX_rt. This steplessly changes the valve timing of the exhaust valves 5 between a reference timing indicated by a solid line in FIG. 2 and a most retarded timing indicated by a broken line in FIG. 2.

In this case, the predetermined most retarded value CAEX_rt is set to a predetermined positive value. Therefore, the valve timing of the exhaust valves 5 is changed to a more retarded timing than the reference timing as the exhaust cam phase CAEX is increased from 0. This lengthens the valve overlap time period of the intake valves 4 and the exhaust valves 5. Note that in the following description, the valve timing of the exhaust valves 5 is referred to as the "exhaust valve timing".

Further, the engine 3 is provided with spark plugs 6, fuel injection valves 7 and a crank angle sensor 30. The spark plugs 6 and the fuel injection valves 7 are provided for the respective cylinders 3a (only one of each of which is shown). The fuel injection valves 7 are mounted in an intake manifold such that fuel is injected into intake ports of the respective cylinders 3a. Both the spark plugs 6 and the fuel injection valves 7 are electrically connected to the ECU 2, and a fuel injection amount and fuel injection timing of fuel injected from each fuel injection valve 7, and an ignition timing in which a mixture is ignited by each spark plug 6 are controlled by the ECU 2. That is, fuel injection control and ignition timing control are executed.

The crank angle sensor 30 delivers a CRK signal, which is a pulse signal, to the ECU 2 along with rotation of the crankshaft 3c. Each pulse of the CRK signal is generated whenever the crankshaft 3c rotates through a predetermined crank angle (e.g. 1°). The ECU 2 calculates a rotational speed NE of the engine 3 (hereinafter referred to as "the engine speed NE") based on the CRK signal.

On the other hand, an air flow sensor 31, an intake pressure sensor 32, an intake air temperature sensor 33, an exhaust pressure sensor 34, an exhaust gas temperature sensor 35, an intake cam angle sensor 36, and an exhaust cam angle sensor 37 are electrically connected to the ECU 2. The air flow sensor 31 detects the flow rate of fresh air flowing through an intake passage 8, and delivers a signal indicative of the detected flow rate of fresh air to the ECU 2. The ECU 2 calculates an intake air amount GAIR based on the detection signal from the air flow sensor 31.

The intake pressure sensor 32 detects a pressure Pin within the intake passage 8 (hereinafter referred to as the "intake pressure Pin"), and delivers a signal indicative of the detected intake pressure Pin to the ECU 2. The intake pressure Pin is detected as an absolute pressure. Further, the intake air temperature sensor 33 detects a temperature Tin of air within the intake passage 8 (hereinafter referred to as the "intake air temperature Tin"), and delivers a signal indicative of the detected intake air temperature Tin to the ECU 2. The intake air temperature Tin is detected as an absolute temperature.

On the other hand, the exhaust pressure sensor 34 detects a pressure Pex within an exhaust passage 9 (hereinafter referred to as the "exhaust pressure Pex"), and delivers a signal indicative of the detected exhaust pressure Pex to the ECU 2. The exhaust pressure Pex is detected as an absolute pressure. Further, the exhaust gas temperature sensor 35 detects a temperature Tex of exhaust gases flowing through the exhaust passage 9 (hereinafter referred to as the "exhaust temperature Tex"), and delivers a signal indicative of the detected exhaust temperature Tex to the ECU 2. The exhaust temperature Tex is detected as an absolute temperature. In the present embodiment, the exhaust pressure sensor 34 corresponds to exhaust pressure-obtaining means, and the exhaust gas temperature sensor 35 corresponds to exhaust temperature-obtaining means.

Further, the intake cam angle sensor 36 is disposed at an end of the intake cam shaft 11 on a side thereof remote from the variable intake cam phase mechanism 12, and delivers an intake cam signal, which is a pulse signal, to the ECU 2 along with rotation of the intake cam shaft 11 whenever the intake cam shaft 11 rotates through a predetermined cam angle (e.g. 1°). The ECU 2 calculates the intake cam phase CAIN based on the intake cam signal and the above-mentioned CRK signal.

Further, the exhaust cam angle sensor 37 is disposed at an end of the exhaust cam shaft 21 on a side thereof remote from the variable exhaust cam phase mechanism 22, and delivers an exhaust cam signal, which is a pulse signal, to the ECU 2 along with rotation of the exhaust cam shaft 21 whenever the exhaust cam shaft 21 rotates through a predetermined cam angle (e.g. 1°). The ECU 2 calculates the exhaust cam phase CAEX based on the exhaust cam signal and the above-mentioned CRK signal. In the present embodiment, the crank angle sensor 30, the intake cam angle sensor 36, and the exhaust cam angle sensor 37 correspond to valve timing-obtaining means. Further, the intake cam phase CAIN corresponds to a value representing the valve timing of each intake valve 4, and the exhaust cam phase CAEX corresponds to a value representing the valve timing of each exhaust valve 5.

On the other hand, the ECU 2 is implemented by a microcomputer comprising a CPU, a RAM, a ROM, and an I/O interface (none of which are specifically shown). Further, the ECU 2 executes a process for calculating an internal EGR amount based on the detection signals from the aforementioned sensors 30 to 37, as described hereinafter, and controls the operations of the spark plugs 6, the fuel injection valves 7, the intake cam phase control valve 12*a*, and the exhaust cam phase control valve 22*a*.

Note that in the present embodiment, the ECU 2 corresponds to the valve timing-obtaining means, reference in-cylinder gas amount-calculating means, inflow/outflow gas change amount-calculating means, internal EGR amount-calculating means, reference in-cylinder capacity-obtaining means, outflow gas change amount-calculating means, and inflow gas change amount-calculating means.

Hereinafter, a description will be given of the principles and viewpoints of a method of calculation of the internal EGR amount, performed by the internal EGR amount calculation device 1 according to the present embodiment. First, referring to FIGS. 3A and 3B, a description will be given of the flow of burned gases occurring when CAIN=CAEX=0 is set, that is, when both of the intake valve timing and the exhaust valve timing are set to the reference timings indicated by the respective solid lines in FIG. 2, referred to hereinabove.

Figure 3A:
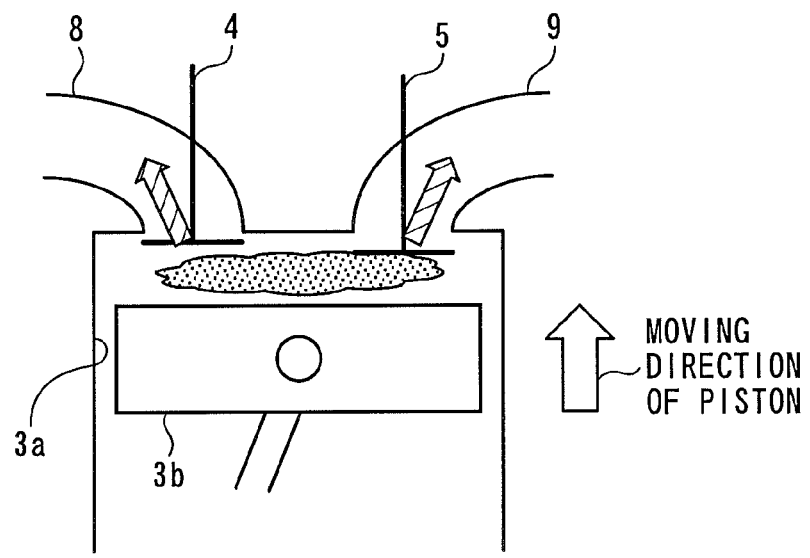
FIG. 3A is a schematic diagram of a flow of burned gases caused when a piston is positioned before an exhaust top dead center when CAIN=CAEX=0 holds.
Figure 3B:
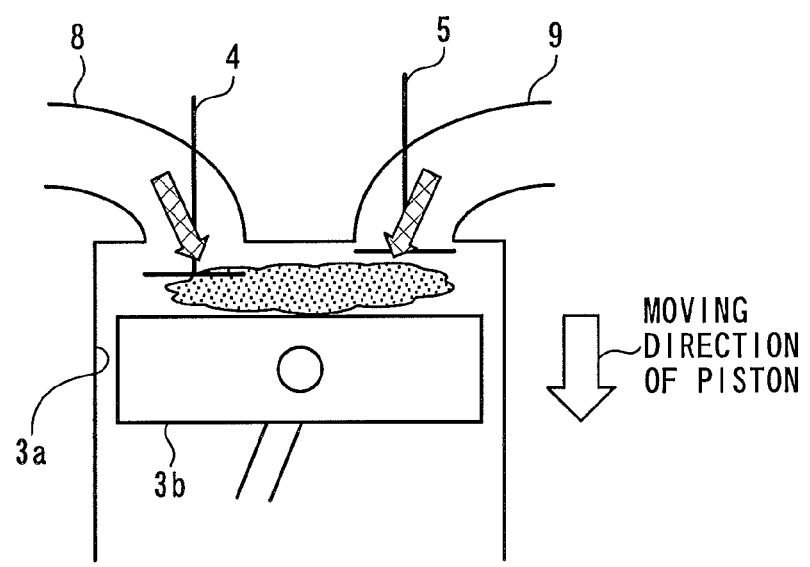
FIG. 3B is a schematic diagram of a flow of burned gases after the piston has passed through the exhaust top dead center when CAIN=CAEX=0 holds.

Note that in FIG. 3A, a hatched arrow indicates the flow of burned gases flowing from the cylinder 3*a* into the intake passage 8 and the exhaust passage 9, and in FIG. 3B, a cross-hatched arrow indicates the flow of burned gases flowing from the intake passage 8 and the exhaust passage 9 into the cylinder 3*a*. The same applies to FIGS. 6A and 6B and FIGS. 10A and 10B, referred to hereinafter.

As shown in FIG. 3A, in a state where the piston 3*b* has not reached the exhaust top dead center, the exhaust valve 5 is open, and the exhaust pressure Pex is lower than pressure within the cylinder 3*a*, whereby burned gases flow from the cylinder 3*a* into the exhaust passage 9. In addition, the intake pressure Pin is lower than the pressure within the cylinder 3*a* after the time the intake valve 4 starts to open, whereby burned gases also flow from the cylinder 3*a* into the intake passage 8. In this case, the lift of the exhaust valve 5 is larger than the lift of the intake valve 4, and hence the amount of outflow of burned gases into the exhaust passage 9 becomes larger than the amount of outflow of burned gases into the intake passage 8.

Further, as shown in FIG. 3B, after the piston 3*b* has reached the exhaust top dead center, the intake valve 4 and the exhaust valve 5 are open, whereby burned gases flow from the intake passage 8 and the exhaust passage 9 into the cylinder 3*a*. Then, after the exhaust valve 5 is closed, burned gases flow into the cylinder 3*a* only from the intake passage 8, whereby the amount of inflow of burned gases from the intake passage 8 becomes larger than the amount of inflow of burned gases from the exhaust passage 9.

Figure 4:
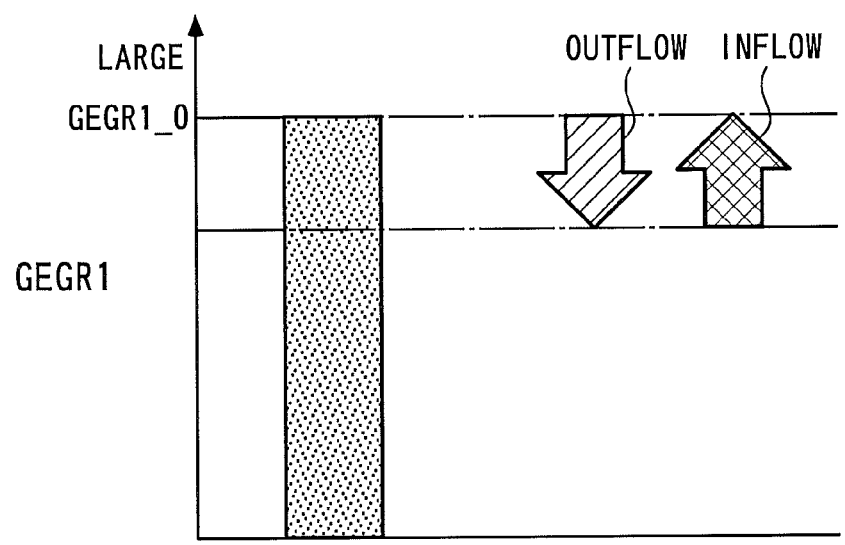
FIG. 4 is a diagram showing an internal EGR amount obtained when CAIN=CAEX=0 holds, an amount of burned gases flowing out of a cylinder, and an amount of burned gases flowing into the cylinder.

According to the above-described operating principles, in the case of the engine 3 according to the present embodiment, when both of the intake valve timing and the exhaust valve timing are set to the reference timings, respectively, as shown in FIG. 4, the amount of outflow of burned gases from the cylinder 3*a* and the amount of inflow of burned gases into the cylinder 3*a* equal to each other, and an internal EGR amount GEGR1 becomes equal to a reference internal EGR amount GEGR1_0, referred to hereinafter. Note that in FIG. 4, the length of a hatched arrow indicates the amount of inflow of burned gases into the cylinder 3*a* and the length of a cross-hatched arrow indicates the amount of outflow of burned gases from the cylinder 3*a*. The same applies to FIGS. 7 and 11.

Figure 5:
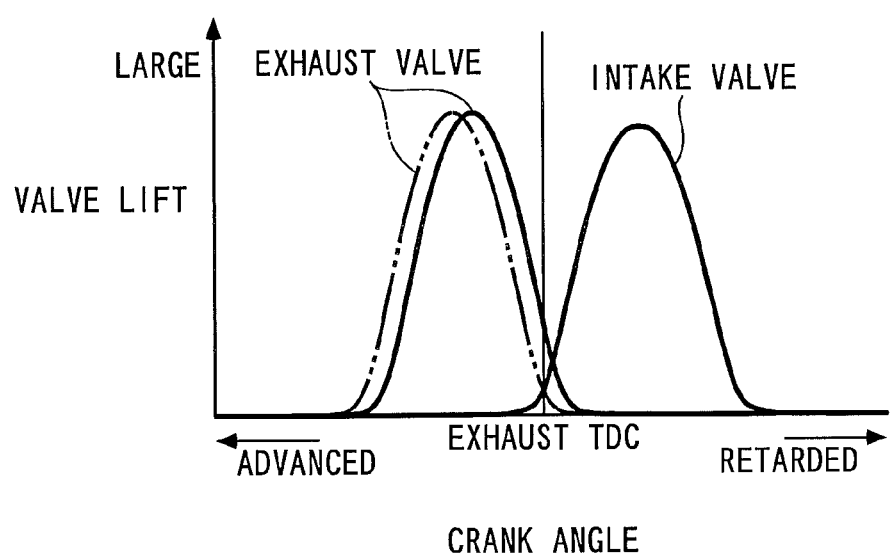
FIG. 5 is a diagram showing valve lift curves of the intake valve and the exhaust valve obtained when CAIN=0 and CAEX>0 hold.
Figure 6A:
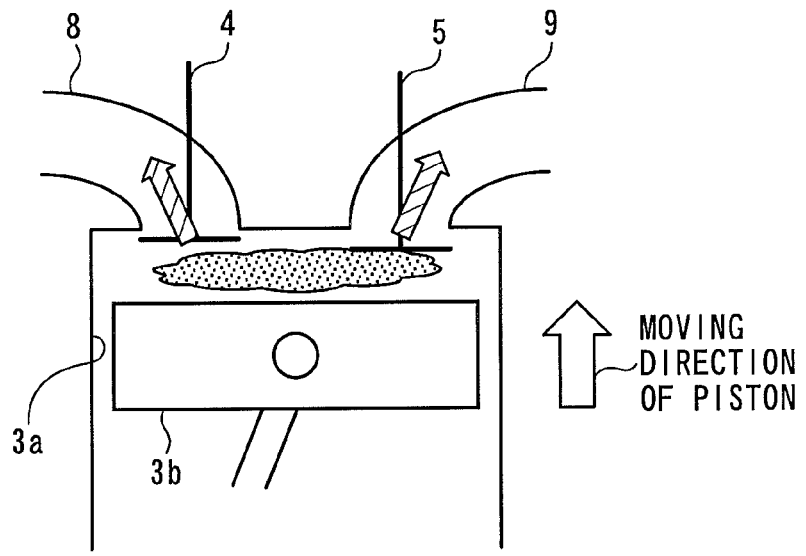
FIG. 6A is a schematic diagram of a flow of burned gases caused when the piston is positioned before the exhaust top dead center when CAIN=0 and CAEX>0 hold.
Figure 6B:
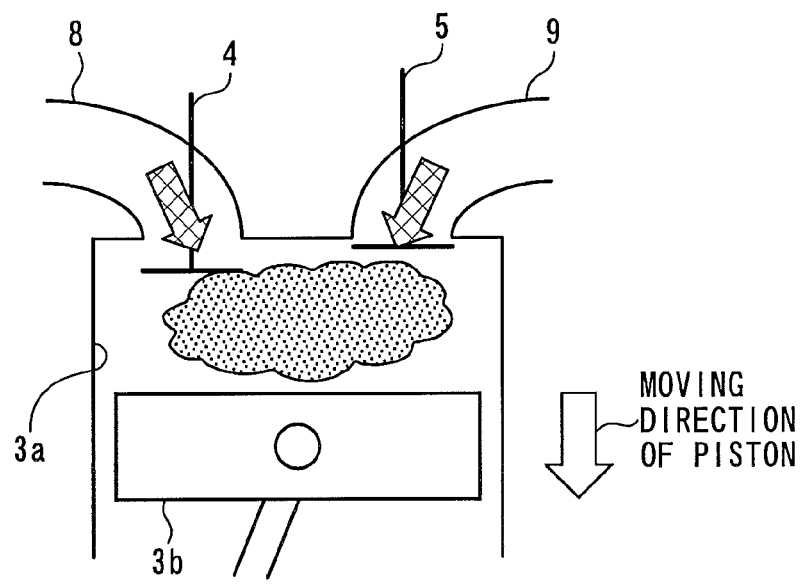
FIG. 6B is a schematic diagram of a flow of burned gases after the piston has passed through the exhaust top dead center when CAIN=0 and CAEX>0 hold.

On the other hand, as shown in FIG. 5, when CAIN=0 and CAEX>0 are set, that is, when the intake valve timing is set to its reference timing, and the exhaust valve timing is set to a more retarded timing than its reference timing, the flow of burned gases becomes as shown in FIGS. 6A and 6B. Note that in FIG. 5, a valve lift curve of the exhaust valve 5, indicated by a solid line, is obtained when CAEX>0 holds, and a valve lift curve of the exhaust valve 5, indicated by a two-dot chain line for reference purposes is obtained when CAEX=0 holds.

First, referring to FIG. 6A, in a state where the piston 3*b* has not reached the exhaust top dead center, similarly to the above-described case shown in FIG. 3A, the exhaust valve 5 is open, and the exhaust pressure Pex is lower than the pressure within the cylinder 3*a*, whereby burned gases flow from the cylinder 3*a* into the exhaust passage 9. In addition, after the time the intake valve 4 starts to open, the intake pressure Pin is lower than the pressure within the cylinder 3*a*, whereby burned gases also flow from the cylinder 3*a* into the intake passage 8. In this case, since CAIN=0 holds, the amount of outflow of burned gases into the intake passage 8 becomes equal to that of burned gases in the case shown in FIG. 3A.

Further, as shown in FIG. 6B, after the piston 3*b* has reached the exhaust top dead center, similarly to the above-described case shown in FIG. 3B, both the intake valve 4 and the exhaust valve 5 are open, whereby burned gases flow from the intake passage 8 and the exhaust passage 9 into the cylinder 3*a*. Then, after the exhaust valve 5 is closed, burned gases flow into the cylinder 3*a* only from the intake passage 8. In this case, since CAEX>0 holds, which means that the valve-closing timing of the exhaust valve 5 is more retarded than when CAEX=0, so that the amount of inflow of burned gases from the exhaust passage 9 becomes larger than in the case shown in FIG. 3B.

Figure 7:
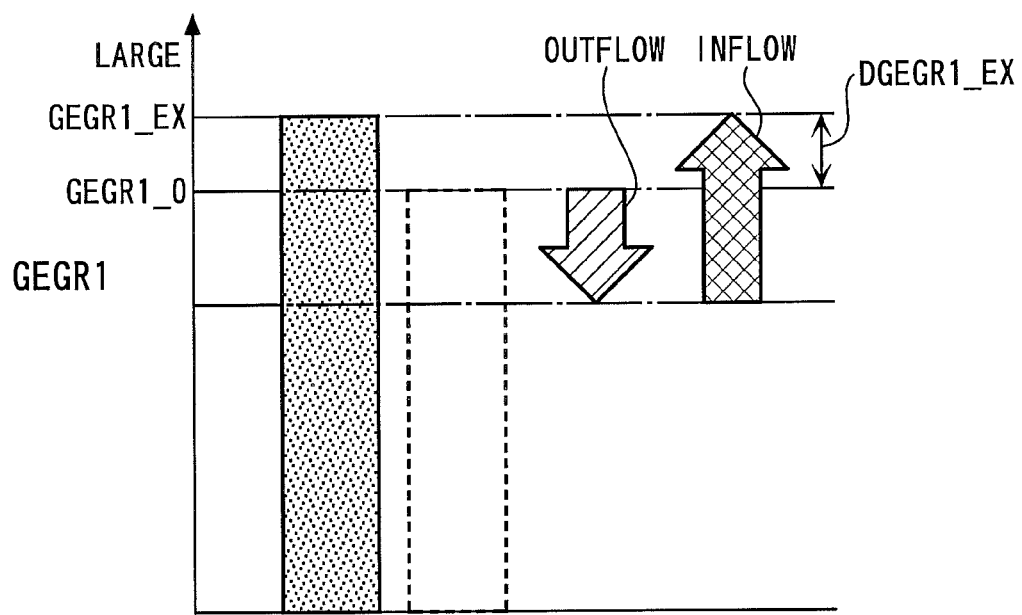
FIG. 7 is a diagram showing the internal EGR amount obtained when CAIN=0 and CAEX>0 hold, the amount of burned gases flowing out of the cylinder, and the amount of burned gases flowing into the cylinder.
Figure 8:
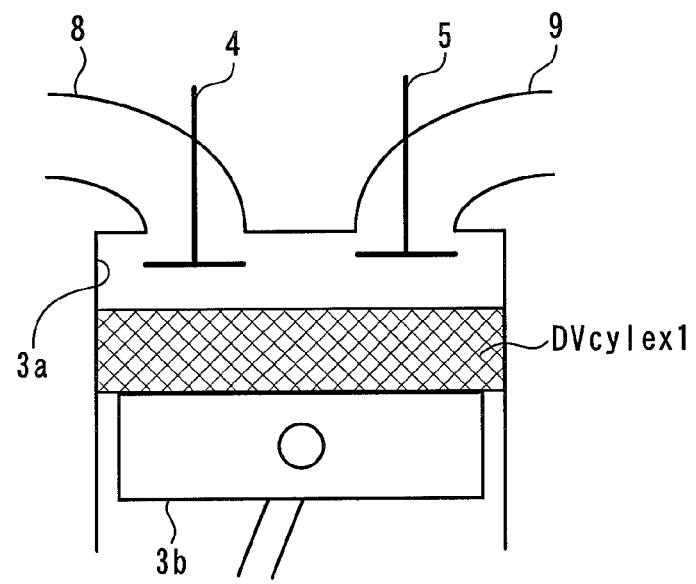
FIG. 8 is a diagram useful in explaining an amount of change in an in-cylinder capacity occurring when CAIN=0 and CAEX>0 hold.

As described hereinabove, in the engine 3 according to the present embodiment, when CAIN=0 and CAEX>0 are set, the amount of outflow of burned gases from the cylinder 3*a* is the same but the amount of inflow of burned gases into the cylinder 3*a* becomes larger, in comparison with the case where CAIN=CAEX=0 is set. As a consequence, as shown in FIG. 7, the internal EGR amount GEGR1 becomes equal to a value GEGR1_EX obtained by adding an increase amount DGEGR1_EX to the above-mentioned reference internal EGR amount GEGR1_0. This means that since the exhaust valve timing is set to a more retarded timing than its reference timing, as shown in FIG. 8, the in-cylinder capacity, i.e. the capacity of the cylinder is in a state in which it can be regarded to have been increased by an increase amount DVcylex1 ((the volume of a cross-hatched area in FIG. 8), than when the exhaust valve timing is set to the reference timing.

Figure 9:
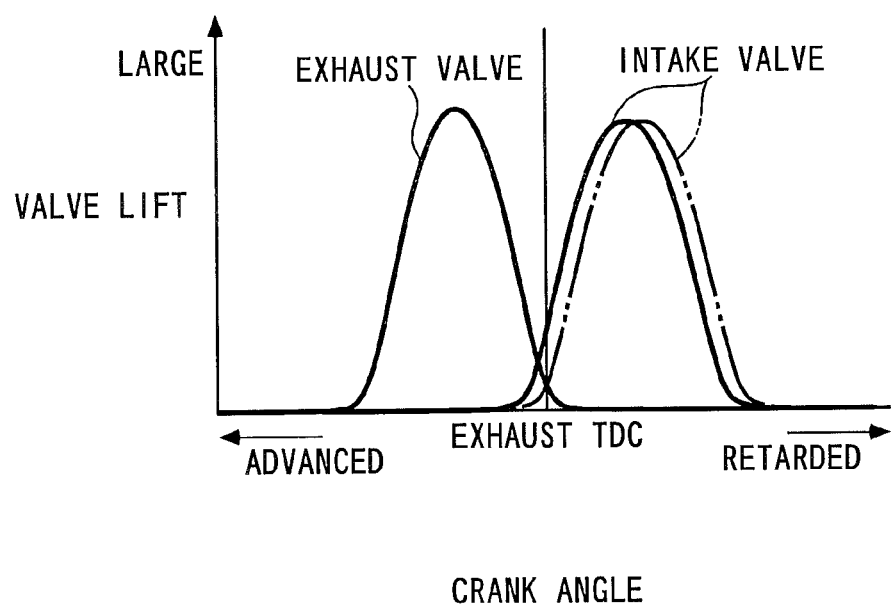
FIG. 9 is a diagram showing valve lift curves of the intake valve and the exhaust valve obtained when CAIN>0 and CAEX=0 hold.

Further, as shown in FIG. 9, when CAIN>0 and CAEX=0 are set, that is, when the intake valve timing is set to a more advanced timing than its reference timing, and the exhaust valve timing is set to its reference timing, the flow of burned gases becomes as shown in FIG. 10. Note that in FIG. 9, a valve lift curve of the intake valve 4, indicated by a solid line, is obtained when CAIN>0 holds, and a valve lift curve of the intake valve 4, indicated by a two-dot chain line for reference purposes, is obtained when CAIN=0 holds.

Figure 10A:
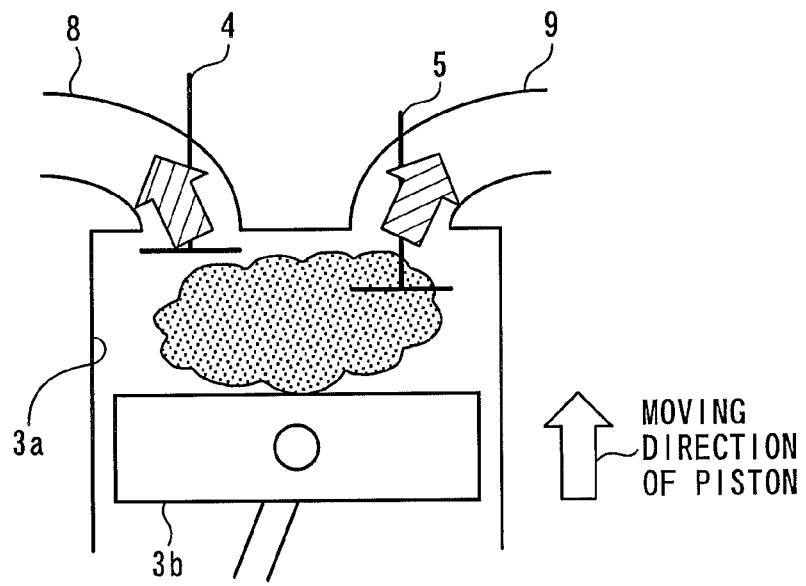
FIG. 10A is a schematic diagram of a flow of burned gases occurring when the piston is positioned before the exhaust top dead center when CAIN>0 and CAEX=0 hold.

First, as shown in FIG. 10A, in a state where the piston 3*b* has not reached the exhaust top dead center, similarly to the above-described case shown in FIG. 3A, the exhaust valve 5 is open, and the exhaust pressure Pex is lower than the pressure within the cylinder 3*a*, whereby burned gases flow from the cylinder 3*a* into the exhaust passage 9. In addition, after the time the intake valve 4 starts to open, the intake pressure Pin is lower than the pressure within the cylinder 3*a*, whereby burned gases also flow from the cylinder 3*a* into the intake passage 8. In this case, since CAIN>0 holds, which means that the valve-opening timing of the intake valve 4 is advanced than when CAIN=0 holds, the amount of outflow of burned gases into the intake passage 8 becomes larger than in the case shown in FIG. 3A.

Figure 10B:
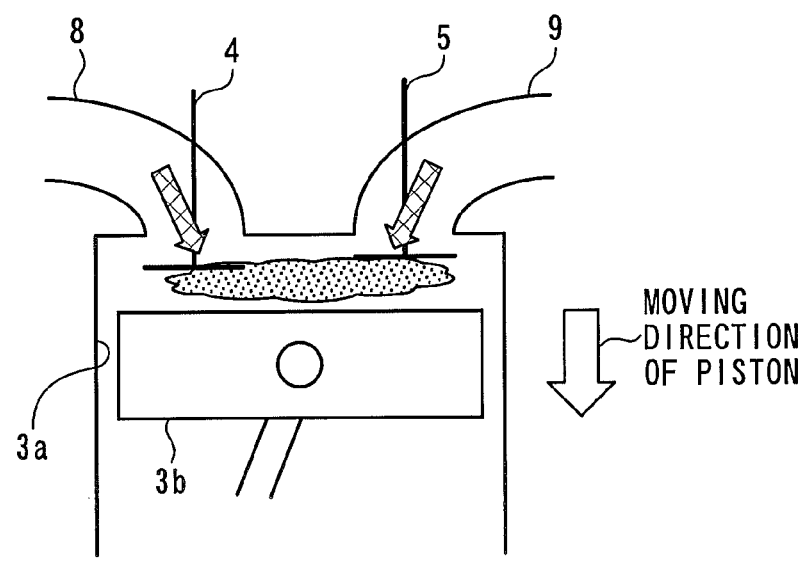
FIG. 10B is a schematic diagram of a flow of burned gases occurring after the piston has passed through the exhaust top dead center when CAIN>0 and CAEX=0 hold.

Further, as shown in FIG. 10B, after the piston 3*b* has reached the exhaust top dead center, similarly to the above-described case shown in FIG. 3B, both the intake valve 4 and the exhaust valve 5 are open, whereby burned gases flow from the intake passage 8 and the exhaust passage 9 into the cylinder 3*a*. Then, after the exhaust valve 5 is closed, burned gases flow into the cylinder 3*a* only from the intake passage 8. In this case, since CAEX=0 holds, the amount of inflow of burned gases becomes equal to that of burned gases in the case shown in FIG. 3B.

Figure 11:
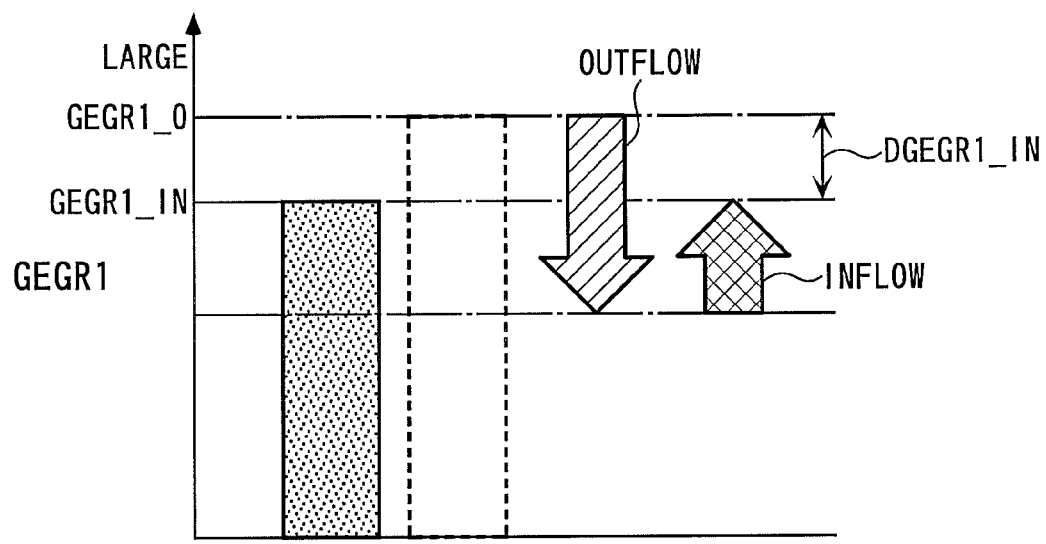
FIG. 11 is a diagram showing the internal EGR amount obtained when CAIN>0 and CAEX=0 hold, the amount of burned gases flowing out of the cylinder, and the amount of burned gases flowing into the cylinder.
Figure 12:
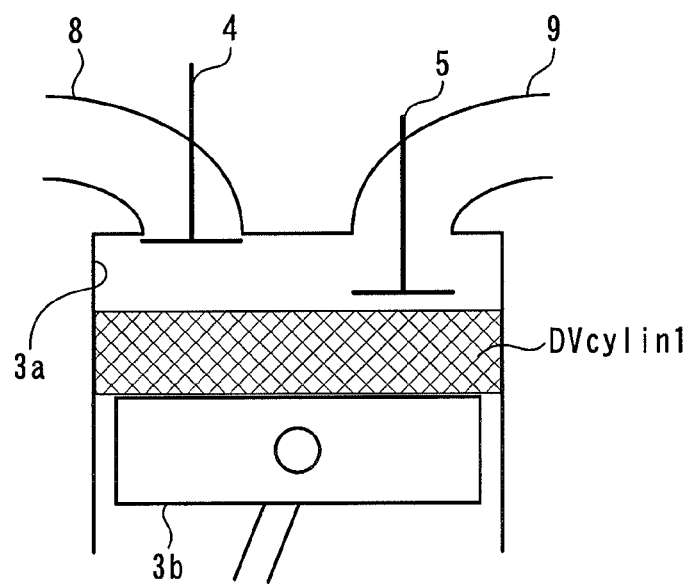
FIG. 12 is a diagram useful in explaining an amount of change in the in-cylinder capacity occurring when CAIN>0 and CAEX=0 hold.

As described above, in the engine 3 according to the present embodiment, when CAIN>0 and CAEX=0 are set, the amount of inflow of burned gases into the cylinder 3*a* is the same but the amount of outflow of burned gases from the cylinder 3*a* becomes larger, in comparison with the case where CAIN=CAEX=0 is set. As a consequence, as shown in FIG. 11, the internal EGR amount GEGR1 becomes equal to a value GEGR1_IN obtained by subtracting a decrease amount DGEGR1_IN from the above-mentioned reference internal EGR amount GEGR1_0. This means that since the intake valve timing is set to a more advanced timing than its reference timing, as shown in FIG. 12, the in-cylinder capacity is in a state in which it can be regarded to have been reduced by a decrease amount DVcylin1 ((the volume of a cross-hatched area in FIG. 12), than when the intake valve timing is set to the reference timing.

Figure 13:
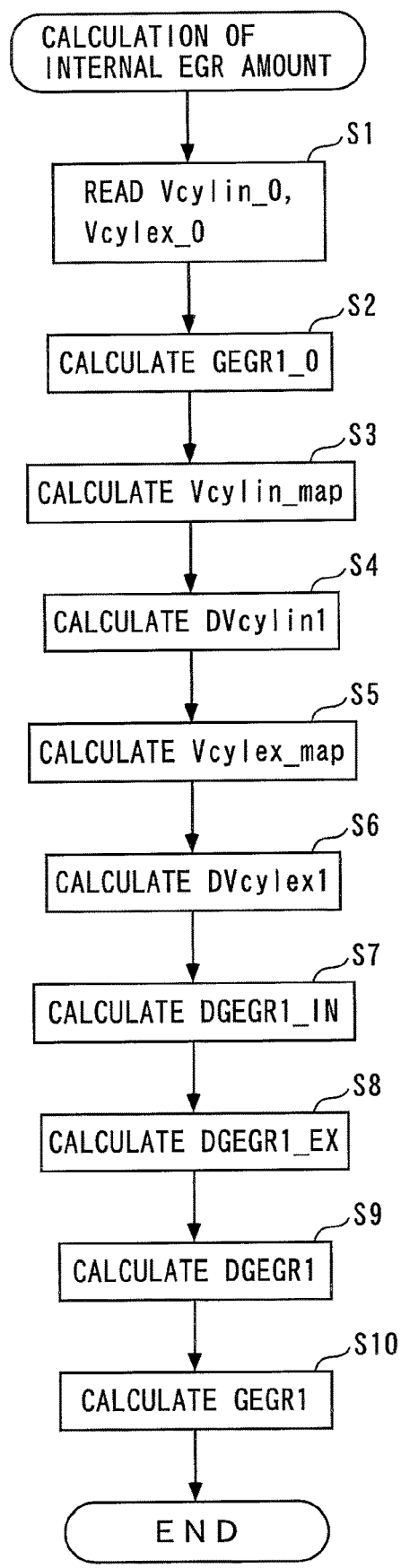
FIG. 13 is a flowchart of a process for calculating the internal EGR amount.

Based on the above-described principles and viewpoints, in the internal EGR amount calculation device 1, as shown in FIG. 13, the process for calculating the internal EGR amount is executed. Specifically, this process is executed by the ECU 2 at a predetermined repetition period.

Referring to FIG. 13, first, in a step 1 (shown as S1 in abbreviated form in FIG. 12; the following steps are also shown in abbreviated form), the values of two reference in-cylinder capacities Vcylin_0 and Vcylex_0, stored in the ROM are read. These reference in-cylinder capacities Vcylin_0 and Vcylex_0 represent in-cylinder capacities obtained when CAIN=CAEX=0 holds, i.e. when both of the intake valve timing and the exhaust valve timing are set to the respective reference timings and are set to the same value.

Next, the process proceeds to a step 2, wherein the reference internal EGR amount GEGR1_0 (reference in-cylinder gas amount) is calculated by the following equation (1):

$$GEGR1\_0 = \frac{Pex \cdot Vcylin\_0}{Re \cdot Tex} \qquad (1)$$

This equation (1) is the equation of state of gas, and Re in the equation (1) represents a gas constant.

Figure 14:
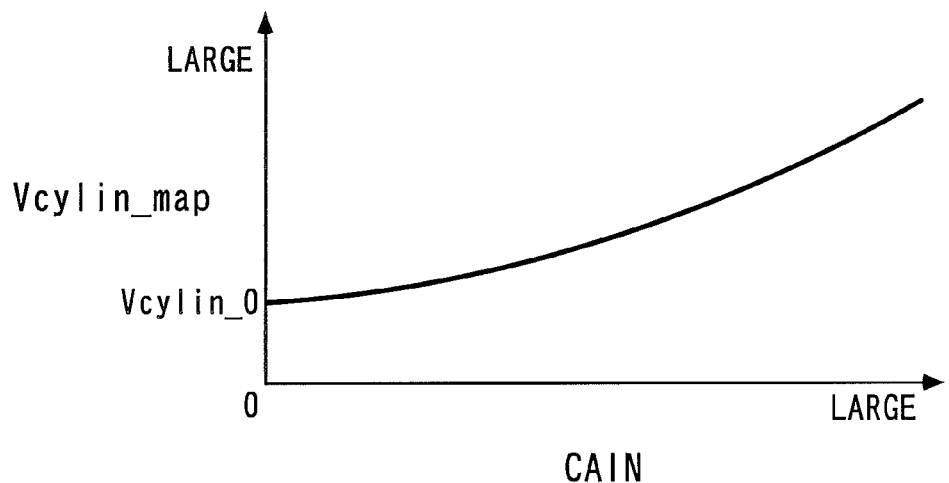
FIG. 14 is a diagram showing an example of a map for use in calculating an intake map value of the in-cylinder capacity.

In a step 3 following the step 2, an intake map value Vcylin_map of the in-cylinder capacity is calculated by searching a map shown in FIG. 14 according to the intake cam phase CAIN. The intake map value Vcylin_map is obtained by adding an amount of increase in the outflow of burned gases from the cylinder 3*a*, which is caused by setting the intake valve timing to a more advanced timing than the reference timing, to the reference in-cylinder capacity Vcylin_0. As shown in FIG. 14, the intake map value Vcylin_map is set to a larger value as the intake cam phase CAIN is larger. This is because as the intake cam phase CAIN is larger, the intake valve timing is set to a more advanced timing than the reference timing, which increases the amount of outflow of burned gases from the cylinder 3*a*.

Then, the process proceeds to a step 4, wherein the decrease amount DVcylin1 is calculated by the following equation (2). This decrease amount DVcylin1 is a value which can be regarded as an amount of decrease in the in-cylinder capacity caused by the fact that the intake valve timing is more advanced than the reference timing, as described above.

$$DVcylin1 = Vcylin\_map - Vcylin\_0 \qquad (2)$$

Figure 15:
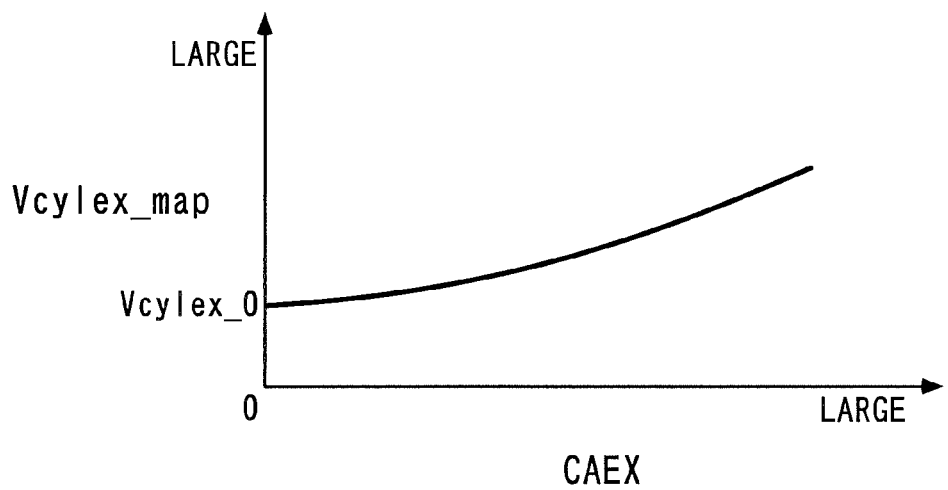
FIG. 15 is a diagram showing an example of a map for use in calculating an exhaust map value of the in-cylinder capacity.

Next, in a step 5, an exhaust map value Vcylex_map of the in-cylinder capacity is calculated by searching a map shown in FIG. 15 according to the exhaust cam phase CAEX. The exhaust map value Vcylex_map is obtained by adding an amount of increase in the inflow of burned gases into the cylinder 3*a* caused by setting the exhaust valve timing to a more retarded timing than the reference timing, to the reference in-cylinder capacity Vcylex_0. As shown in FIG. 15, the exhaust map value Vcylex_map is set to a larger value as the exhaust cam phase CAEX is larger. This is because as the exhaust cam phase CAEX is larger, the exhaust valve timing is set to a more retarded timing than the reference timing, which increases the amount of inflow of burned gases into the cylinder 3*a*.

Then, the process proceeds to a step 6, wherein the increase amount DVcylex1 is calculated by the following equation (3). The increase amount DVcylex1 is a value which can be regarded as an amount of increase in the in-cylinder capacity caused by the fact that the exhaust valve timing is more retarded than the reference timing, as described above.

$$Dlicylex1 = Vcylex\_map - Vcylex\_0 \qquad (3)$$

In a step 7 following the step 6, an outflow gas increase amount DGEGR1_IN (outflow gas change amount) is calculated by the following equation (4). This equation (4) is based on the equation of state of gas, and the outflow gas increase amount DGEGR1_IN corresponds to an amount of increase in the outflow of burned gases from the cylinder 3*a*, caused when the intake valve timing is more advanced than the reference timing.

$$DGEGR1\_IN = \frac{Pex \cdot DVcylin1}{Re \cdot Tex} \qquad (4)$$

Then, the process proceeds to a step 8, wherein an inflow gas increase amount DGEGR1_EX (inflow gas change amount) is calculated by the following equation (5). This equation (5) is based on the equation of state of gas, and the inflow gas increase amount DGEGR1_EX corresponds to an amount of increase in the inflow of burned gases into the cylinder 3*a*, caused when the exhaust valve timing is more retarded than the reference timing.

$$\text{DGEGR1\_EX} = \frac{Pex \cdot DVcylex1}{Re \cdot Tex} \quad (5)$$

Next, in a step 9, an internal EGR increase/decrease amount DGEGR1 (inflow/outflow gas change amount) is calculated by the following equation (6):

$$\text{DGEGR1} = \text{DGEGR1\_EX} - \text{DGEGR1\_IN} \quad (6)$$

Then, finally, in a step 10, the internal EGR amount GEGR1 is calculated by the following equation (7), followed by terminating the present process.

$$\text{GEGR1} = \text{GEGR1\_0} + \text{DGEGR1} \quad (7)$$

Figure 16:
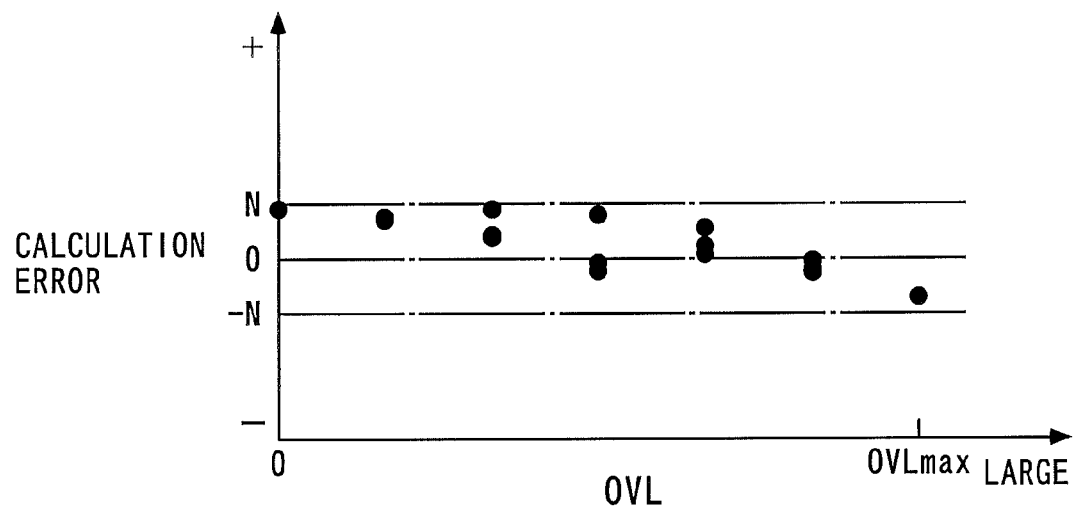
FIG. 16 is a diagram showing an example of a calculation error occurring when the internal EGR amount is calculated by a method according to the present invention.
Figure 17:
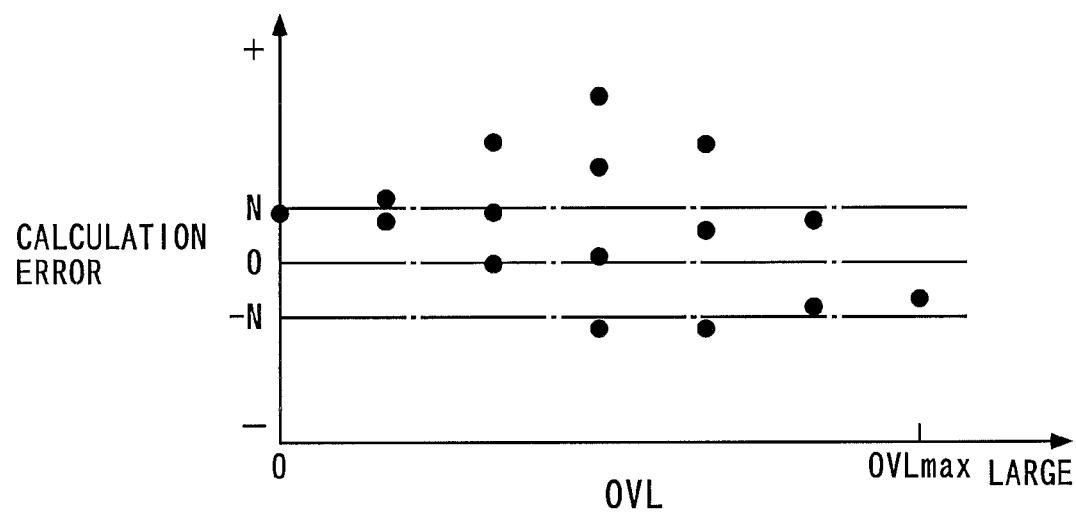
FIG. 17 is a diagram, for comparison, showing an example of a calculation error of the internal EGR amount occurring when an internal EGR increase/decrease amount is set to 0.

Next, the accuracy of the result of calculation of the internal EGR amount GEGR1 by the internal EGR amount calculation device 1 according to the present embodiment will be explained with reference to FIGS. 16 and 17. In FIGS. 16 and 17, an overlap angle OVL on the horizontal axis is calculated as the sum of the intake cam phase CAIN and the exhaust cam phase CAEX. Further, a value OVLmax indicates the maximum value of the overlap angle OVL, which is calculated by adding CAIN_ad to CAEX_rt (OVLmax=CAIN_ad+CAEX_rt). In this case, since the intake cam phase CAIN and the exhaust cam phase CAEX are set as described hereinabove, the overlap angle OVL is calculated as a larger value as the valve overlap period is longer.

FIG. 16 shows the relationship between the calculation error of the internal EGR amount GEGR1 by the internal EGR amount calculation device 1 according to the present embodiment and the overlap angle OVL. The calculation error expresses a difference between the result of calculation of the internal EGR amount GEGR1 and an actual value, as a percentage. Further, FIG. 17 shows, for comparison, the relationship between the calculation error of the internal EGR amount GEGR1 and the overlap angle OVL, occurring when the internal EGR increase/decrease amount DGEGR1=0 and the internal EGR amount GEGR1=GEGR1_0 are set.

First, as shown in FIG. 16, it is understood that when the internal EGR amount GEGR1 is calculated by correcting the reference internal EGR amount GEGR1_0 using the internal EGR increase/decrease amount DGEGR1, the calculation error is within a range of ±N % (N is an integer) irrespective of the magnitude of the overlap angle OVL. On the other hand, as shown in FIG. 17, it is understood that when the internal EGR amount GEGR1 is calculated as a value equal to the reference internal EGR amount GEGR1_0 by setting the internal EGR increase/decrease amount DGEGR1=0, the absolute value of the calculation error is larger than the value N, and the calculation accuracy is reduced.

That is, it is understood that when the internal EGR amount GEGR1 is calculated as in the present embodiment, the calculation accuracy of the internal EGR amount GEGR1 is improved by correcting the reference internal EGR amount GEGR1_0 using the internal EGR increase/decrease amount DGEGR1.

As described above, according to the internal EGR amount calculation device 1 of the present embodiment, the reference internal EGR amount GEGR1_0 is calculated based on the reference in-cylinder capacity Vcylin_0, the exhaust temperature Tex, and the exhaust pressure Pex, using the equation of state of gas. In this case, in the timing that the intake valve 4 starts to open, the exhaust valve 5 is open, so that the pressure and temperature of in-cylinder gases become substantially equal to the exhaust pressure Pex and the exhaust temperature Tex, respectively. Therefore, by calculating the reference internal EGR amount GEGR1_0 using the exhaust pressure Pex and the exhaust temperature Tex, it is possible to accurately calculate the reference internal EGR amount GEGR1_0 as the internal EGR amount to be obtained when both the intake valve timing and the exhaust valve timing are set to the respective reference timings.

Further, by subtracting the outflow gas increase amount DGEGR1_IN from the inflow gas increase amount DGEGR1_EX, the internal EGR increase/decrease amount DGEGR1 is calculated, and by adding the internal EGR increase/decrease amount DGEGR1 to the reference internal EGR amount GEGR1_0, the internal EGR amount GEGR1 is calculated. In this case, the outflow gas increase amount DGEGR1_IN corresponds to the amount of increase in the outflow of burned gases from the cylinder 3a, caused when the intake valve timing is more advanced than the reference timing, and the inflow gas increase amount DGEGR1_EX corresponds to the amount of increase in the inflow of burned gases into the cylinder 3a, caused when the exhaust valve timing is more retarded than the reference timing. This means that the internal EGR increase/decrease amount DGEGR1 is calculated as an amount of change in the inflow or outflow of burned gases into or from the cylinder 3a with respect to a value of the inflow or outflow of burned gases obtained when both the intake valve timing and the exhaust valve timing are set to the reference timings. Therefore, the internal EGR amount GEGR1 is calculated by adding the internal EGR increase/decrease amount DGEGR1 thus calculated to the reference internal EGR amount GEGR1_0, so that it is possible to properly and accurately calculate the internal EGR amount GEGR1 while causing a change in the amount of burned gases flowing into or out of the cylinder 3a caused by a change in at least one of the intake valve timing and the exhaust valve timing to be reflected on the internal EGR amount GEGR1. This makes it possible to improve the calculation accuracy of the internal EGR amount.

Furthermore, as describe heretofore, the reference internal EGR amount GEGR1_0, the inflow gas increase amount DGEGR1_EX, the outflow gas increase amount DGEGR1_IN, the internal EGR increase/decrease amount DGEGR1, and the internal EGR amount GEGR1 can be calculated in a single calculation process, and hence it is possible to more easily calculate the internal EGR amount GEGR1 than by a calculation method disclosed in Japanese Laid-Open Patent Publication (Kokai) No. 2004-251182, which requires an integral computation process, thereby making it possible to reduce computational load in calculating the internal EGR amount GEGR1. As a consequence, it is possible to enhance marketability.

Although in the above-described embodiment, the engine 3 including the variable intake cam phase mechanism 12 and the variable exhaust cam phase mechanism 22 is used as an internal combustion engine in which the valve timing of at least one of each intake valve 4 and each exhaust valve 5 is variable, by way of example, the internal combustion engine according to the present invention is not limited to this, but any suitable internal combustion engine may be employed insofar as it can change the valve timing of at least one of each intake valve and each exhaust valve.

For example, the internal EGR amount calculation device according to the present invention may be applied to an internal combustion engine including the variable intake cam phase mechanism 12 alone. In this case, it is only required to omit the steps 5, 6, and 8 in the above-described calculation process in FIG. 13, and set DGEGR1_EX=0 in the equation (6) for calculating the internal EGR increase/decrease amount DGEGR1 in the step 9.

Further, the internal EGR amount calculation device according to the present invention may be applied to an internal combustion engine including the variable exhaust cam phase mechanism 22 alone. In this case, it is only required to omit the steps 3, 4, and 7 in the above-described calculation process in FIG. 13, and set DGEGR1_IN=0 in the equation (6) for calculating the internal EGR increase/decrease amount DGEGR1 in the step 9.

Furthermore, an internal combustion engine may be used in which a mechanism other than the variable intake cam phase mechanism 12 and the variable exhaust cam phase mechanism 22 changes the valve timing of at least one of each intake valve 4 and each exhaust valve 5. For example, as a mechanism for changing the valve timing, there may be used a variable cam phase mechanism formed by combining an electric motor and a gear mechanism, an electromagnetic valve-actuating mechanism which actuates valve elements by associated solenoids, a valve timing changing mechanism for mechanically changing the valve timing using a three-dimensional cam, or a valve timing-changing mechanism for changing the valve timing by changing of the lift of at least one of each intake valve 4 and each exhaust valve 5.

Further, the internal EGR amount calculation device according to the present invention may be applied to an internal combustion engine which includes not only the variable intake cam phase mechanism 12 and the variable exhaust cam phase mechanism 22 but also a variable lift mechanism for changing the valve lift of at least one of each intake valve 4 and each exhaust valves 5. In this case, it is only required to configure the internal EGR amount calculation device such that the two values Vcylin_map and Vcylex_map are calculated by using N (N is an integer not smaller than 2) maps in which the relationship between the intake map value Vcylin_map and the intake cam phase CAIN and the relationship between the exhaust map value Vcylex_map and the exhaust cam phase CAEX are set in a manner associated with N valve lift values, in place of the above-described maps shown in FIGS. 14 and 15. Further, the internal EGR amount calculation device may be configured such that the two values Vcylin_map and Vcylex_map are calculated using two maps in which the relationship between the two values Vcylin_map and Vcylex_map and the two cam phases CAIN and CAEX and the valve lift are defined, respectively, in place of the above-described maps shown in FIGS. 14 and 15.

Although in the above-described embodiment, the ECU 2, the crank angle sensor 30, the intake cam angle sensor 36, and the exhaust cam angle sensor 37 are used as the valve timing-obtaining means, by way of example, the valve timing-obtaining means according to the present invention is not limited to this, but any suitable valve timing-obtaining means may be employed insofar as it is capable of obtaining the valve timing. For example, the valve timing may be configured such that the valve timing is detected using the ECU 2 and a sensor other than the above-described sensors.

Furthermore, although in the above-described embodiment, the exhaust pressure sensor 34 is used as the exhaust pressure-obtaining means, by way of example, the exhaust pressure-obtaining means of the present invention is not limited to this, but any suitable exhaust pressure-obtaining means may be employed insofar as it is capable of obtaining the exhaust pressure. For example, the exhaust pressure-obtaining means may be configured such that an estimated value of the exhaust pressure is calculated by an estimation calculation method using a model equation.

On the other hand, although in the above-described embodiment, the exhaust gas temperature sensor 35 is used as the exhaust temperature-obtaining means, by way of example, the exhaust temperature-obtaining means of the present invention is not limited to this, but any suitable exhaust temperature-obtaining means may be employed insofar as it is capable of obtaining the exhaust temperature. For example, the exhaust temperature-obtaining means may be configured such that an estimated value of the exhaust temperature is calculated by an estimation calculation method using a model equation.

Further, although in the above-described embodiment, the internal EGR amount calculation device 1 according to the present embodiment is applied to the engine 3 installed on a vehicle, by way of example, this is not limitative, but it can be applied to an internal combustion engine installed on a boat or other industrial machines.

It is further understood by those skilled in the art that the foregoing are preferred embodiments of the invention, and that various changes and modifications may be made without departing from the spirit and scope thereof.

What is claimed is:

1. An internal EGR amount calculation device for an internal combustion engine, which changes an internal EGR amount, which is an amount of burned gases remaining in a cylinder, by changing valve timing of at least one of an intake valve and an exhaust valve, comprising:
   valve timing-obtaining means for obtaining the valve timing;
   reference in-cylinder gas amount-calculating means for calculating a reference in-cylinder gas amount, which is an amount of burned gases remaining in the cylinder when the valve timing is set to a predetermined reference timing;
   inflow/outflow gas change amount-calculating means for calculating an amount of change in an amount of burned gases flowing into or out of the cylinder during valve-opening time periods of the intake valve and the exhaust valve, with respect to an amount of burned gases flowing into or out of the cylinder when the valve timing is set to the predetermined reference timing, as an inflow/outflow gas change amount, according to the valve timing; and
   internal EGR amount-calculating means for calculating the internal EGR amount based on the reference in-cylinder gas amount and the inflow/outflow gas change amount,
   wherein the internal EGR amount is used to change the valve timing of at least one of the intake valve and exhaust valve.

2. The internal EGR amount calculation device as claimed in claim 1, further comprising:
   exhaust temperature-obtaining means for obtaining an exhaust temperature, which is a temperature of exhaust gases in an exhaust passage of the engine;
   exhaust pressure-obtaining means for obtaining an exhaust pressure, which is a pressure of exhaust gases in the exhaust passage of the engine; and
   reference in-cylinder capacity-obtaining means for obtaining a reference in-cylinder capacity, which is a capacity of the cylinder obtained when the valve timing is set to the predetermined reference timing,
   wherein said reference in-cylinder gas amount-calculating means calculates the reference in-cylinder gas amount, based on the exhaust temperature, the exhaust pressure, and the reference in-cylinder capacity, using an equation of state of gas.

3. The internal EGR amount calculation device as claimed in claim 1, wherein the valve timing of the intake valve is configured to be variable, and wherein said valve timing-obtaining means obtains the valve timing of the intake valve, the internal EGR amount calculation device further comprising outflow gas change amount-calculating means for calculating, based on the valve timing of the intake valve, an amount of change in an amount of burned gases flowing out of the cylinder with respect to a value of the amount of burned gases flowing out of the cylinder, obtained when the valve timing of the intake valve is set to the predetermined reference timing, as an outflow gas change amount, wherein said inflow/outflow gas change amount-calculating means calculates the inflow/outflow gas change amount based on the outflow gas change amount.

4. The internal EGR amount calculation device as claimed in claim 2, wherein the valve timing of the intake valve is configured to be variable, and wherein said valve timing-obtaining means obtains the valve timing of the intake valve, the internal EGR amount calculation device further comprising outflow gas change amount-calculating means for calculating, based on the valve timing of the intake valve, an amount of change in an amount of burned gases flowing out of the cylinder with respect to a value of the amount of burned gases flowing out of the cylinder, obtained when the valve timing of the intake valve is set to the predetermined reference timing, as an outflow gas change amount, wherein said inflow/outflow gas change amount-calculating means calculates the inflow/outflow gas change amount based on the outflow gas change amount.

5. The internal EGR amount calculation device as claimed in claim 1, wherein the valve timing of the exhaust valve is configured to be variable, and wherein said valve timing-obtaining means obtains the valve timing of the exhaust valve, the internal EGR amount calculation device further comprising inflow gas change amount-calculating means for calculating, based on the valve timing of the exhaust valve, a change in an amount of burned gases flowing into the cylinder with respect to a value of the amount of burned gases flowing into the cylinder, obtained when the valve timing of the exhaust valve is set to the predetermined reference timing, as an inflow gas change amount, wherein said inflow/outflow gas change amount-calculating means calculates the inflow/outflow gas change amount based on the inflow gas change amount.

6. The internal EGR amount calculation device as claimed in claim 2, wherein the valve timing of the exhaust valve is configured to be variable, and wherein said valve timing-obtaining means obtains the valve timing of the exhaust valve, the internal EGR amount calculation device further comprising inflow gas change amount-calculating means for calculating, based on the valve timing of the exhaust valve, a change in an amount of burned gases flowing into the cylinder with respect to a value of the amount of burned gases flowing into the cylinder, obtained when the valve timing of the exhaust valve is set to the predetermined reference timing, as an inflow gas change amount, wherein said inflow/outflow gas change amount-calculating means calculates the inflow/outflow gas change amount based on the inflow gas change amount.

7. The internal EGR amount calculation device as claimed in claim 1, wherein the valve timing of the intake valve and the valve timing of the exhaust valve are configured to be variable, and wherein said valve timing-obtaining means obtains both the valve timing of the intake valve and the valve timing of the exhaust valve, the internal EGR amount calculation device further comprising:

outflow gas change amount-calculating means for calculating, based on the valve timing of the intake valve, a change in an amount of burned gases flowing out of the cylinder with respect to a value of the amount of burned gases flowing out of the cylinder, obtained when the valve timing of the intake valve is set to the predetermined reference timing, as an outflow gas change amount, and inflow gas change amount-calculating means for calculating, based on the valve timing of the exhaust valve, a change in an amount of burned gases flowing into the cylinder with respect to a value of the amount of burned gases flowing into the cylinder, obtained when the valve timing of the exhaust valve is set to the predetermined reference timing, as an inflow gas change amount, wherein said inflow/outflow gas change amount-calculating means calculates the inflow/outflow gas change amount based on the outflow gas change amount and the inflow gas change amount.

8. The internal EGR amount calculation device as claimed in claim 2, wherein the valve timing of the intake valve and the valve timing of the exhaust valve are configured to be variable, and wherein said valve timing-obtaining means obtains both the valve timing of the intake valve and the valve timing of the exhaust valve, the internal EGR amount calculation device further comprising:

outflow gas change amount-calculating means for calculating, based on the valve timing of the intake valve, a change in an amount of burned gases flowing out of the cylinder with respect to a value of the amount of burned gases flowing out of the cylinder, obtained when the valve timing of the intake valve is set to the predetermined reference timing, as an outflow gas change amount, and inflow gas change amount-calculating means for calculating, based on the valve timing of the exhaust valve, a change in an amount of burned gases flowing into the cylinder with respect to a value of the amount of burned gases flowing into the cylinder, obtained when the valve timing of the exhaust valve is set to the predetermined reference timing, as an inflow gas change amount, wherein said inflow/outflow gas change amount-calculating means calculates the inflow/outflow gas change amount based on the outflow gas change amount and the inflow gas change amount.

* * * * *